United States Patent [19]

Cooney

[11] Patent Number: 5,209,396
[45] Date of Patent: May 11, 1993

[54] STEAM WATER MIXING HOSE STATION

[75] Inventor: Robert N. Cooney, West Goshen, Pa.

[73] Assignee: Cooney Brothers, Inc., Philadelphia, Pa.

[21] Appl. No.: 848,158

[22] Filed: Mar. 9, 1992

[51] Int. Cl.$^5$ .............................. G05D 23/13
[52] U.S. Cl. .................... 236/12.14; 137/355.28
[58] Field of Search ............. 236/12.14, 12.11, 12.12, 236/12.15; 137/355.16, 355.28

[56] References Cited

U.S. PATENT DOCUMENTS

| | | | |
|---|---|---|---|
| 1,903,085 | 3/1933 | Barnes, Jr. | 137/355.28 |
| 1,942,269 | 1/1934 | Davies et al. | 236/12.15 X |
| 2,372,533 | 3/1945 | Torbett | 236/12.14 X |
| 2,455,498 | 12/1948 | Kern | 236/12.11 X |
| 2,752,095 | 6/1956 | Puster | 236/12.14 |
| 4,429,422 | 2/1984 | Wareham | 236/12.12 X |

Primary Examiner—Harry B. Tanner
Attorney, Agent, or Firm—Zachary T. Wobensmith, III

[57] ABSTRACT

A steam and water mixing hose station is provided with control of the steam flow ahead of its mixing with cold water which control compensates for pressure drops in either the steam or water pressure to maintain the temperature of the steam/water mixture. The hose station has a temperature control valve on the steam supply side ahead of a mixing chamber where steam and water are mixed, a sensing chamber connected to the outlet of the mixing chamber with a liquid filled temperature sensing bulb therein which is connected to the valve to regulate the steam flow to the mixing chamber based on the temperature in the sensing chamber.

3 Claims, 2 Drawing Sheets

STEAM WATER MIXING HOSE STATION

BACKGROUND OF THE INVENTION

1. Field of the Invention

This invention relates to control of the steam flow to a steam and water mixing hose station where control of the steam flow and the temperature of the mixed steam and water is accomplished by sensing the temperature of the mixture and regulating the steam flow to maintain the temperature of the mixture at a preset value.

2. Description of the Prior Art

Hose stations are known in the art. Such stations mix hot water or steam with cold water, and the mixture is used to wash down animal carcasses, machinery and other items. Such stations typically include a supply of steam under pressure and a supply of cold water under pressure, which are mixed in a mixing chamber. A hose is connected to the outlet of the mixing chamber from which the mixture is available as required. The flow of steam and water to the mixing chamber is usually controlled by conventional, manually adjustable, shut-off valves on the supply lines, which are satisfactory so long as there is no pressure drop in the flow of steam or water. The temperature of the mixture is determined by various safety and operational considerations, and for animal carcasses must be maintained within a narrow range.

The steam supplied can be at a pressure of up to 150# and the cold water up to 100#. The steam temperature can be up to 366° F. The high temperatures and pressures may cause a hazardous condition, and injury to the operator and other persons result, should the water pressure drop suddenly resulting in the temperature of the mixture rising to an unacceptable level. A drop in steam pressure can cause the temperature of the mixed cold water and steam to drop below the required operational temperatures.

Precise automatic control of the steam/water output temperature is therefore necessary at all times for safety and operational reasons.

SUMMARY OF THE INVENTION

A steam/cold water mixing hose station where the flow of incoming steam to the mixing chamber is controlled by monitoring the temperature in a sensing chamber of the mixed water/steam output of the mixing chamber, and signalling a steam flow control valve as required to vary the steam flow so that the temperature of the mixture is maintained at a preset value.

The principal object of the invention is to provide a steam/cold water mixing hose station with automatic temperature control of the output.

A further object of the invention is to provide a hose station of the character aforesaid which provides precise temperature control of the mixed output for wide variations of steam and water flow, and temperature.

A further object of the invention is to provide a hose station of the character aforesaid, wherein the temperature of the mixture is readily adjustable.

A further object of the invention is to provide a hose station of the character aforesaid which is fail safe should a supply of water not be available.

A further object of the invention is to provide a hose station of the character aforesaid which is simple to construct, requires little maintenance, and is durable and long lasting in operation.

A further object of the invention is to provide a hose station of the character aforesaid which includes a rack for hose storage.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Figure 1:
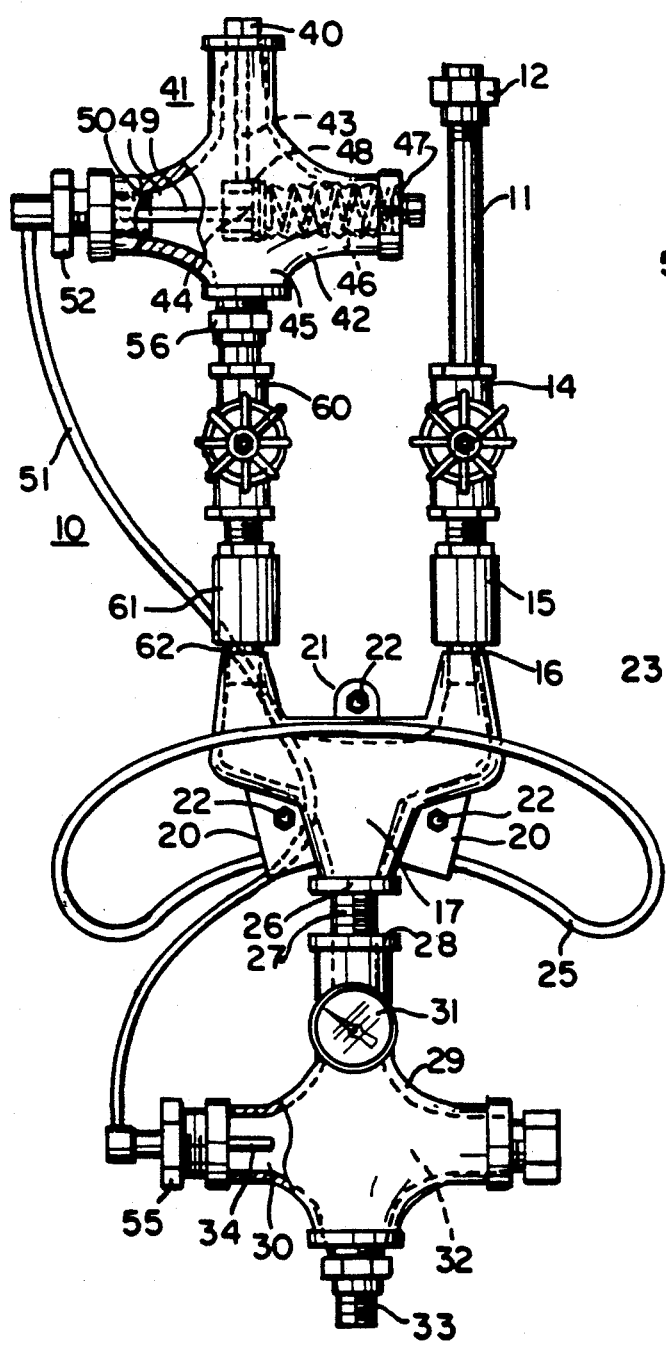
FIG. 1 is a front elevational view of the steam and cold water mixing hose station of the invention.
Figure 2:
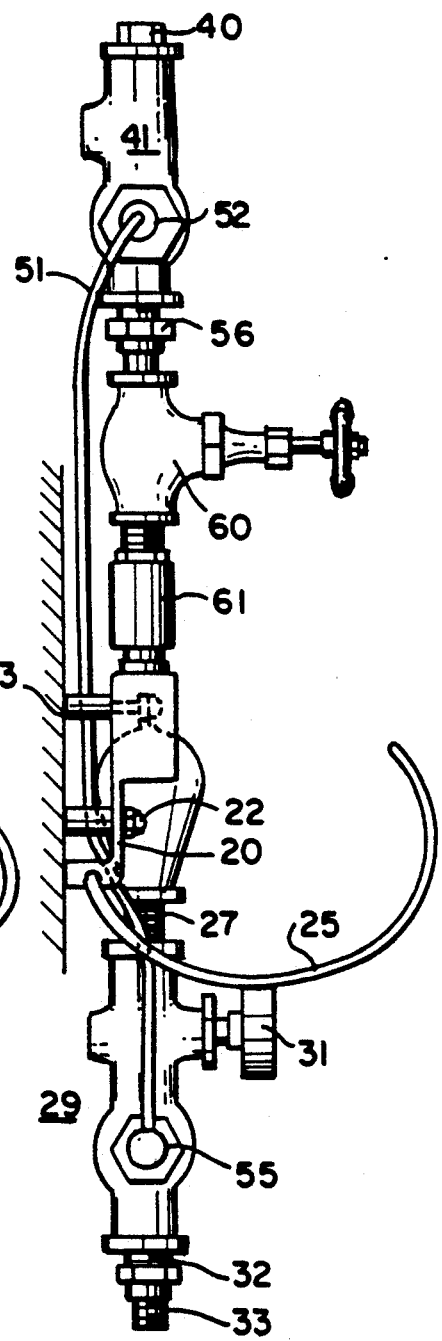
FIG. 2 is a left side elevational view of the hose station of FIG. 1.

Referring now more particularly to the drawings and FIGS. 1 and 2 thereof the steam and water mixing hose station 10 is therein illustrated. The hose station 10 includes a pipe 11 with a union 12 which is connected to a supply of cold water under pressure (not shown). The pipe 11 is connected to a manually adjustable flow control valve 14, of well known type, which is connected to a check valve 15 of well known type. The check valve 15 is connected to an inlet 16 of a housing 13 which has a mixing chamber 17 therein.

The housing 13 has plates 20, and 21 extending therefrom with anchor bolts 22 therein to mount the hose station 10 to a wall or other surface 23. A hose rack 25 is provided, preferably of stainless steel, of kidney shape in front view, secured in the plates 20, extending forwardly from the housing 13, and of C shape in side view. The rack 25 permits the hose (not shown) to be stowed thereon. The housing 13 has an outlet 26 which is connected by nipple 27 to the inlet 28 of a housing 29 which has a temperature sensing chamber 30 therein. The housing 29 has a temperature gauge 31 of well known type to provide a visual readout of the temperature of the steam/water mixture in the chamber 30. The housing 29 has an outlet 32 with a hose adapter 33 connected thereto to which a hose (not shown) is attached. The hose station 10 has a pipe 40 connected to a supply of steam under pressure (not shown) which is connected to a control valve assembly 41. The assembly 41 includes a body 42 which has an inlet passageway 43, a valve seat 44 and an outlet passageway 45. The control valve assembly 41 includes a spring urged bellows 46 which urges valve rim 48 towards seat 44. The tension on bellows 46 is varied by rotating the temperature control knob 47 to preset the temperature at which the water steam mixture is to be dispensed. The valve rim 48 is carried on a stem 49, which extends to a thermostat bellows 50, which has an armored capillary tube 51 engaged therewith. The tube 51 is retained in body 42 by a cap 52 through which the tube 51 extends. The tube 51 is connected to a liquid filled thermal expansion temperature sensing bulb 54 of well known type, which is carried in the temperature sensing chamber 30 of housing 29, and retained therein by a cap 55, through which tube 51 extends. The temperature sensing bulb 54 is of well known type, and contains a liquid that has a lower boiling temperature than water. The bulb 54 accordingly reacts quickly to changes in temperature, and through tube 51 by thermal expansion controls valve assembly 41. The control valve assembly 41 has a union 56 in communication with the outlet passageway 45, which is connected to a manually adjustable flow control shut-off valve 60 of well known type similar to valve 14. The valve 60 is connected to a check valve 61 similar to valve 15, which valve 61 is connected to inlet 62 of housing 13, which communicates with mixing chamber 17.

Figure 3:
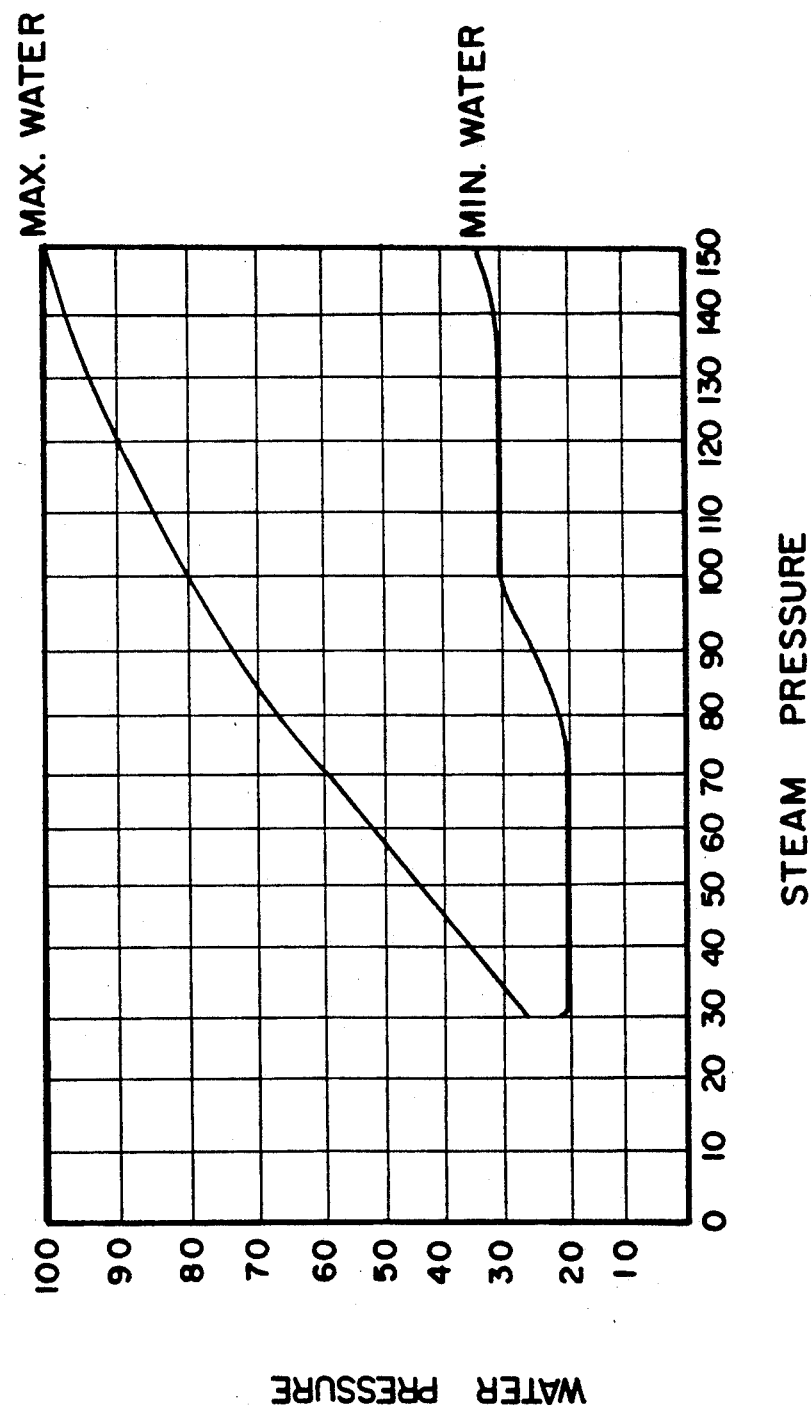
FIG. 3 is a chart illustrating the steam and water pressure relationship for the hose station of the invention.

Referring now to FIG. 3 a chart is disclosed, which illustrates water pressure increments from 0 to 100 psig on the vertical, and steam pressure increments from 0 to 150 psig on the horizontal. Two additional lines are shown which relate to minimum water, and to maximum water, and the relationships between the steam and water pressure is shown at the intersection of the lines.

The mode of operation will now be pointed out.

The temperature control knob 47 is adjusted to provide the desired water steam mixture temperature consistent with the expected use of the mixture. The valves 14 and 60 are opened so that steam and water flow into mixing chamber 17, the mixture then flows through outlet 26, through nipple 27, and through inlet 28 of housing 29 into sensing chamber 30. The temperature gauge 31 indicates the temperature of the steam water mixture in sensing chamber 30, and valves 14 and 60 may be adjusted as required to provide the desired temperature which is illustrated on gauge 31. The liquid filled temperature sensing bulb 55 through thermal expansion in tube 51 will cause valve rim 48 to move towards or away from seat 44 should either steam or water pressure drop, which would affect the mixture temperature in chamber 30 should steam flow vary. The valve rim 48 position will likewise vary to maintain sufficient steam flow so that the temperature in sensing chamber 30 is maintained at the desired preset value. A sudden drop in cold water pressure, which would cause the temperature to rise above the preset value results in the valve rim 48 contacting the seat 44, and cutting off the steam flow. A sudden drop in the steam pressure causes bellows 46 to move valve rim 48 to seat 44, and cut off the flow through the outlet passageway 45.

It will thus be seen that apparatus has been provided with which the objects of the invention are achieved.

I claim:

1. A steam and water mixing hose station that does not require electricity for operation, which is connected to a source of steam under pressure and a source of cold water under pressure, which provides a mixture of steam and water at a controlled temperature which does not require the water or steam to be maintained at a constant pressure, which comprises steam flow control valve means connected to said source of steam, a manually operated steam shut-off valve connected to said steam flow control valve means, a check valve connected to said manually operated steam shut-off valve, mixing chamber means having a steam inlet, a water inlet and a steam/water mixture outlet, said steam check valve connected to said mixing chamber steam inlet, a manually operated water shut-off valve connected to said source of water, a check valve connected to said water shut off valve and to said mixing chamber water inlet, sensing chamber means connected to said steam/water mixture outlet of said mixing chamber, a liquid filled temperature sensing bulb in said sensing chamber means, a tube connecting said bulb to said steam flow control valve means to signal it to control the steam flow through said control valve means in response to the sensed temperature of the steam water mixture, and to maintain the mixture output temperature at a safe level, said sensing chamber means having an outlet, and a hose adapter connected to said sensing chamber outlet.

2. A hose station as defined in claim 1 in which said sensing chamber has a temperature gage therein to provide a visual readout of the temperature.

3. A hose station as defined in claim 1 in which a hose rack is provided for stowage of hose.

* * * * *

UNITED STATES PATENT AND TRADEMARK OFFICE
CERTIFICATE OF CORRECTION

PATENT NO. : 5,209,396

DATED : MAY 11, 1993

INVENTOR(S) : ROBERT N. COONEY

It is certified that error appears in the above-identified patent and that said Letters Patent is hereby corrected as shown below:

On the title page item [54] and in col. 1, line 2.
TITLE: CHANGE "STEAM WATER MIXING HOSE STATION" TO
--STEAM AND WATER MIXING HOSE STATION--.

Signed and Sealed this

Fourth Day of January, 1994

*Attest:*

BRUCE LEHMAN

*Attesting Officer*     *Commissioner of Patents and Trademarks*